(12) United States Patent
Sasser et al.

(10) Patent No.: US 10,817,958 B1
(45) Date of Patent: *Oct. 27, 2020

(54) ROBOTIC DETECTION APPARATUS WITH ARTIFICIAL INTELLIGENCE AND MACHINE LEARNING

(71) Applicants: William Sasser, St. Louis, MO (US); Howard Herndon, Nashville, TN (US)

(72) Inventors: William Sasser, St. Louis, MO (US); Howard Herndon, Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/846,586

(22) Filed: Apr. 13, 2020

Related U.S. Application Data

(63) Continuation of application No. 14/922,603, filed on Oct. 26, 2015, which is a continuation-in-part of application No. 13/588,838, filed on Aug. 17, 2012, now abandoned.

(51) Int. Cl.
| | |
|---|---|
| *G06Q 40/00* | (2012.01) |
| *G06N 20/00* | (2019.01) |
| *G06Q 30/04* | (2012.01) |
| *G06Q 20/20* | (2012.01) |

(52) U.S. Cl.
CPC .......... *G06Q 40/123* (2013.12); *G06N 20/00* (2019.01); *G06Q 40/10* (2013.01); *G06Q 40/125* (2013.12); *G06Q 20/207* (2013.01); *G06Q 30/04* (2013.01); *G06Q 40/00* (2013.01)

(58) Field of Classification Search
CPC .... G06Q 20/207; G06Q 30/04; G06Q 40/123; G06Q 40/10; G06Q 40/00
See application file for complete search history.

(56) References Cited

U.S. PATENT DOCUMENTS

| | | |
|---|---|---|
| 7,188,083 B2 | 3/2007 | Agee et al. |
| 2003/0055754 A1 | 3/2003 | Sullivan |
| 2004/0002906 A1 | 1/2004 | Von Drehnen et al. |
| 2005/0261995 A1 | 11/2005 | Phelan |
| 2008/0021799 A1 | 1/2008 | Blowers |
| 2009/0187500 A1 | 7/2009 | Wilson et al. |
| 2010/0306071 A1 | 12/2010 | Kay |

(Continued)

OTHER PUBLICATIONS

U.S. Appl. No. 13/588,838 to Herndon et al., filed Aug. 7, 2012.

(Continued)

*Primary Examiner* — A. Hunter Wilder
(74) *Attorney, Agent, or Firm* — Akerman LLP; Stephen C. Glazier

(57) ABSTRACT

Various robotic detection apparatus with artificial intelligence and machine learning, and with a processor, a memory, a vendor identification engine, a compliance engine, and a reporting engine, are disclosed. The apparatus automatically updates its updating databases, thereby improving its results, and thereby learning and becoming more intelligent as time passes. The apparatus automatically analyses its data and detects non-compliance with various tax statutes by specific tax payors. The apparatus may receive tax information from one or more sources, combine all or some of the information into a single form, and apply various software processes to calculate a weighted average. The average is then compared to a threshold to determine whether a person or entity is in tax compliance.

13 Claims, 10 Drawing Sheets

(56) References Cited

U.S. PATENT DOCUMENTS

2014/0052592 A1* 2/2014 Herndon ............ G06Q 40/00
705/31
2016/0042466 A1 2/2016 Herndon

OTHER PUBLICATIONS

Esparza, Theresa et al., Sales Tax Audit Best Practices, The Tax Adviser; New York, N.Y., vol. 43, issue 7, pp. 458-463 (Jul. 2012).

* cited by examiner

300

ROBOTIC DETECTION APPARATUS WITH ARTIFICIAL INTELLIGENCE AND MACHINE LEARNING

CROSS-REFERENCE TO RELATED APPLICATIONS

This application is a continuation application of U.S. patent application Ser. No. 14/922,603, filed on Oct. 26, 2015, which is a continuation-in-part of U.S. patent application Ser. No. 13/588,838, filed Aug. 17, 2012 (now abandoned), the entirety of which are incorporated herein by reference.

FIELD OF TECHNOLOGY

The present specification describes developments in the technological field of robotic detection apparatus with artificial intelligence and machine learning.

Various embodiments of the robotic detection apparatus automatically update their databases, thereby improving their detection results, and thereby automatically learning and becoming more intelligent as time passes.

The apparatus may automatically analyze its updating databases to detect noncompliance with various tax statues by specific taxpayers. The apparatus may receive tax information from one or more sources, combine all or some of the information into a single form, and apply various software processes to calculate a weighted average. The average is then compared to a threshold to determine whether a taxpayer is in tax compliance.

BACKGROUND

Tax collection and compliance is a major expense for tax authorities. Tax collection and compliance includes ensuring that all vendors that are subject to a particular tax, pay the tax, as well as ensuring that the amount paid by each entity is correct.

Some methods for tax collection and compliance rely on the tax authorities themselves to identify vendors who are not compliant. For example, the tax authorities may rely on investigators to determine vendors doing business in their jurisdiction that are subject to one or more taxes, but that have not filed a tax return. However, such methods are not cost effective and may fail to identify non-compliant vendors.

Other methods for tax collection and compliance generally have been focused on the point-of-sale. Examples include software that is integrated into the point-of-sale terminals. However, the use of such systems is voluntary and therefore does not address non-compliance or tax evasion.

Another problem with existing tax collection and compliance systems is that vendors typically pay their tax obligations periodically, and frequently monthly. This creates several drawbacks for tax authorities. One such drawback is that tax authorities typically receive all of the tax revenue at the end of the applicable period and as a result they are not able to determine if the revenue that is received during the period will meet or fail to meet expectations until well after the period has ended and taxes are due. Because tax authorities generally do not have a complete understanding ahead of time of the taxes that are or will be collected with respect to a given period, they may not be able to make necessary spending adjustments or budgetary decisions.

SUMMARY

The present specification describes developments in the technological field of robotic detection apparatus with artificial intelligence and machine learning. Various embodiments of the robotic detection apparatus automatically update their databases, thereby improving their detection results, and thereby automatically learning and becoming more intelligent as time passes. The apparatus may automatically analyze its updating databases to detect noncompliance with various tax statues by specific taxpayers. The apparatus may receive tax information from one or more sources, combine all or some of the information into a single form, and apply various software processes to calculate a weighted average. The average is then compared to a threshold to determine whether a taxpayer is in tax compliance.

In one aspect, a method includes receiving electronically first tax information including at least one tax identification number (TIN) and first address information associated with the TIN; applying automatically a first address standardization process to the first tax information, including applying automatically one or more parsing algorithms to determine if the first address information is valid and in a first format; receiving electronically business registration information and second tax information including second address information and automatically applying a set-based algorithm to combine the second tax information into a single form; applying automatically a name and a second address standardization process to the combined second tax information, including automatically applying one or more parsing algorithms to determine if second address information is valid and in a second format; applying automatically a matching process, including: applying automatically a fixed length matching algorithm to determine a TIN match; determining automatically an exact match between the first and second addresses; and applying automatically a bigram algorithm to determine a business name match; calculating automatically a weighted average of the TIN match, the exact match, and the business name match; and determining automatically if the weighted average is above a threshold.

The method may also include that the first address standardization processes decomposes the first address into one or more component parts, and wherein the second address standardization processes decomposes the second address into one or more component parts.

The method may also include wherein fixed length matching algorithm is a hamming algorithm, and wherein the name process includes a business dictionary. The method may also include wherein second address standardization processes includes a USPS certified database, and wherein first address standardization processes includes a USPS certified database.

The method may include that the threshold varies, and that the weighted match is calculated as "(FEIN/TIN match score.times.FEIN/TIN weight)+(Name match score.times.Name weight)+(Address match score.times.Address weight). The method may also include wherein a ranking algorithm is applied to form one or more lists.

In another aspect, a system is disclosed including a processor and a memory, wherein the memory stores executable code accessible by the processor to execute operations comprising: receiving electronically first tax information including at least one tax identification number (TIN) and first address information associated with the TIN; applying automatically a first address standardization process to the first tax information, including applying automatically one or more parsing algorithms to determine if the first address information is valid and in a first format; receiving electronically business registration information and second tax information including second address information and automatically applying a set-based algorithm to combine the second tax information into a single form; applying automatically a name and a second address standardization process to the combined second tax information, including automatically applying one or more parsing algorithms to determine if second address information is valid and in a second format; applying automatically a matching process, including: applying automatically a fixed length matching algorithm to determine a TIN match; determining automatically an exact match between the first and second addresses; and applying automatically a bigram algorithm to determine a business name match; calculating automatically a weighted average of the TIN match, the exact match, and the business name match; and determining automatically if the weighted average is above a threshold.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
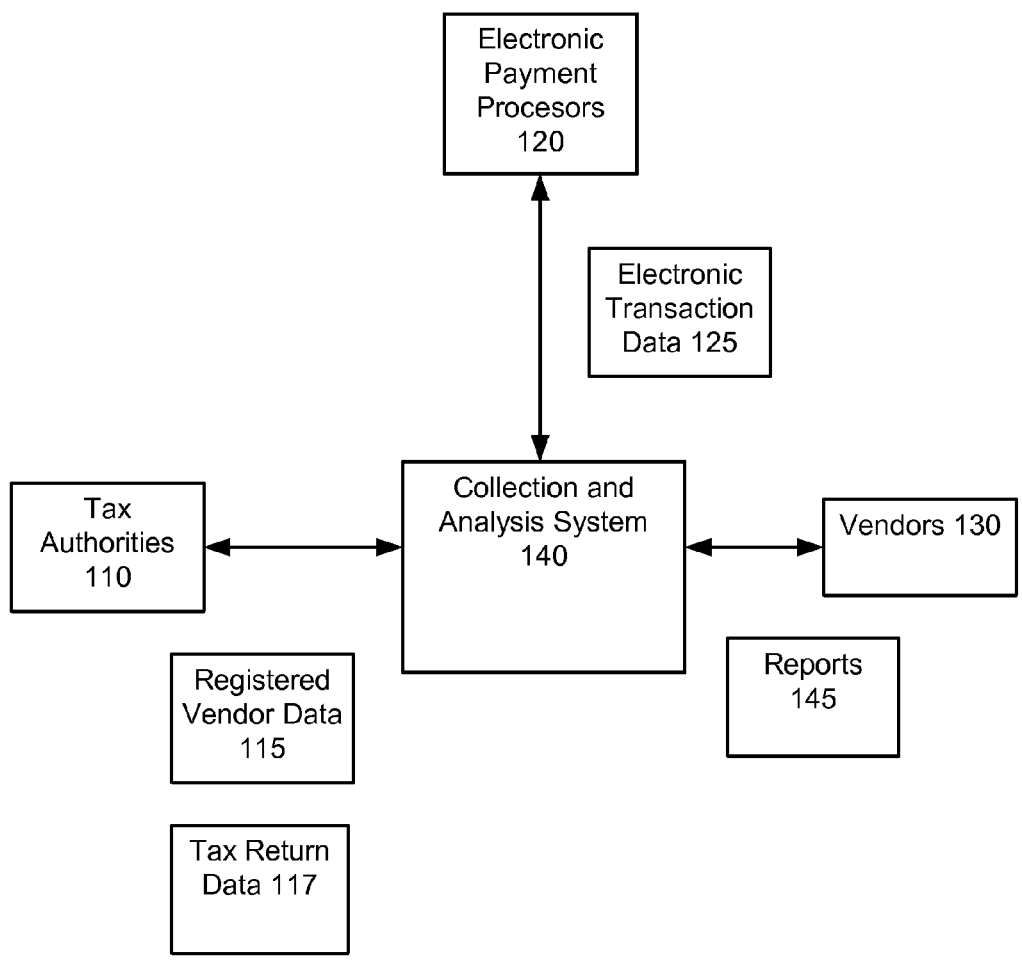
FIG. 1 is an illustration of an example environment for providing tax collection and compliance.

FIG. 1 is an illustration of an example environment 100 for providing tax collection and compliance. The environment 100 may include a collection and analysis system 140 in communication with one or more vendors 130, tax authorities 110, and electronic payment processors 120 through a network. The network may be a variety of network types including the public switched telephone network (PSTN), a cellular telephone network, and a packet switched network (e.g., the Internet).

The vendors 130 may include any entity (i.e., a person, corporation, or partnership) selling, renting or leasing tangible property, or providing taxable services within the jurisdiction of a tax authority 110. The tax authorities 110 may include the federal government, state governments, and local or municipal governments. The tax authorities 110 may further include foreign governments. The taxes collected and/or assessed by the tax authorities 110 may include a sale tax, gross receipts tax, business tax, value added tax, fee, and any other type of fee or tax that may be incurred on an entire transaction or on part of a transaction.

The electronic payment processors 120 may process electronic payments for the vendors 130. The electronic payments may include payment card transactions or any other type of electronic transaction. The electronic payment processors 120 may include banks, payment card issuers, and one or more entities that process electronic payments on behalf of the banks, payment card issuers, or any other entities.

As will be described in further detail with respect to FIG. 2, the collection and analysis system 140 may provide tax analysis services to one or more tax authorities 110. One such service is the identification of vendors 130 that may be subject to the jurisdiction of the tax authority 110. For example, a tax authority 110 may contract with a collection and analysis system 140 to identify vendors 130 that are subject to the jurisdiction of the tax authority 110 and/or subject to a particular tax imposed by the tax authority 110. The jurisdiction of the tax authority may include vendors 110 geographically located in the jurisdiction, or that do business in the jurisdiction. In some implementations, the collection and analysis system 140 may identify the vendors 130 based on electronic transaction data 125 provided by the electronic processors 120.

The collection and analysis system 140 may provide tax collection services to one or more tax authorities 110. In some implementations, the system may execute tax collection by querying an electronic payment processor to receive electronic transaction data that affects the relevant taxing authority. The system then may analyze this data and send execution instructions directing the electronic payment processor to deduct monies owed to the taxing authority prior to settlement with the vendor.

For example, the collection and analysis system 140 may determine a deduction for the electronic payment processors 120 to apply to the electronic payments (or any other type of electronic transaction) processed for each vendor 130. The deduction may be individually determined for each vendor 130 by the collection and analysis system 140 based on the particular tax or taxes assessed by the tax authority 110. The deduction may be a fixed or specified amount of money, or may be an applicable percentage that is applied to the gross transactions processed for each vendor 130. The applicable percentage may be applied to each individual transaction, or may be applied to many transactions in a batch. The transactions may be requests to process payment card sales (or any other type of electronic transaction). The funds deducted from each vendor 130 may then be provided to the tax authority 110 immediately, or according to a schedule.

The collection and analysis system 140 may further provide tax reporting services to one or more tax authorities 110 and/or vendors 130. The reporting services may include generating one or more reports 145 to the tax authorities 110 of the funds collected from the vendors 130. The reports 145 may be generated and provided periodically (e.g., daily, monthly, quarterly, etc.), or may be generated and provided when requested.

The tax filing services may include the collection and analysis system 140 assisting with the preparation of, or preparing of one or more tax filings for the vendors 130. Other types of filings or information may be supported. For example, the collection and analysis system 140 may provide a vendor 130 with an accounting of the funds that have been deducted for a particular tax by the vendor 130 over a quarter or fiscal year, and may determine (based on vendor input) if any additional funds are owed by the vendor 130 or if the vendor 130 is entitled to a refund. The collection and analysis system 140 may then assist the vendor 130 with paying any underage or collecting any overage in the form of a refund. In some implementations, the collection and analysis system 140 may assist the vendor 130 in preparing and filing a tax return with the tax authorities 110.

The collection and analysis system 140 may further provide auditing services to the tax authorities 110. Through the auditing services the collection and analysis system 140 may identify vendors 130 who have underpaid a particular tax in the past, or that should have paid a particular tax, but that did not. In some implementations, the collection and analysis system 140 may perform the auditing services by correlating the electronic transaction data 125 provided from the electronic payment processors 120 and tax return data 117. The tax return data 117 may include tax returns and other types of filings or information provided to the tax authorities by the vendors 130. The electronic transaction data 125 may be a history of electronic transactions (i.e., credit card transactions) processed for the vendor and may be used by the collection and analysis system 140 to estimate what taxes each vendor 130 should have paid in a particular tax year. The estimated taxes may be compared against the taxes that were actually paid as indicated by the tax return data 117 to identify possible delinquent or owed taxes.

The collection and analysis system 140 provides several advantages to tax authorities 110, including, but not limited to, the assessment and collection of tax monies owed to the tax authority from the relevant electronic transactions. The system 140 also enables the collection of monies from vendors 130 that either are underreporting their tax or simply not reporting at all. The collection and analysis system 140 serves as a hub that coordinates the collection, processing, and payment of taxes among the tax authorities 110, vendors 130, and electronic payment processors 120. With respect to the tax authorities 110, the vendor 130 identification service helps identify vendors 130 that are subject to the jurisdiction of the tax authority 110 which helps increase the tax base without added costs. The auditing service similarly helps increase revenue to the tax authorities 110 by identifying potential tax evaders or the accidental or intentional underpayment of taxes. The continuous deduction of taxes from the electronic transactions by the electronics payment processors 120 ensures a continuous reliable supply of tax revenue, which may help reduce borrowing costs of the tax authorities 110 and may also help the tax authorities 110 make more accurate projections with respect to the revenue collected by the tax authorities 110 for a given tax period.

With respect to the vendors 130, the continuous deduction of taxes from the electronic transactions prevents a vendor 130 from misjudging its tax liabilities and not having sufficient funds at the end of a tax period to meet its obligations. The tax reporting services provide an easy way for the vendor 130 to monitor how much money it has paid over a tax period, and to prepare and file tax returns with a tax authority 110.

Figure 2:
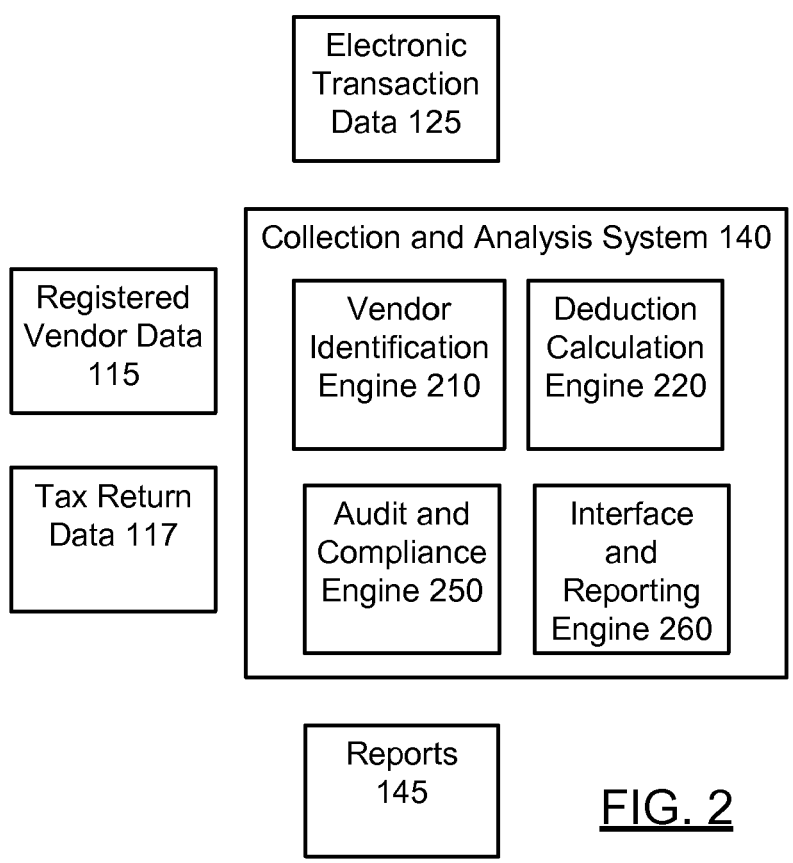
FIG. 2 is an illustration of an example collection and analysis system.

FIG. 2 is an illustration of an example collection and analysis system 140. As illustrated, the system 140 includes a plurality of components including a vendor identification engine 210, a deduction calculation engine 220, an audit and compliance engine 250, and an interface and reporting engine 260. The collection and analysis system 140, including the various components described herein, may be implemented by one or more computing devices such as the computing system 600 illustrated with respect to FIG. 6. While each of the components is shown as part of the collection and analysis system 140, each component may be implemented separately or without the other components. Thus for example, in some implementations, the system 140 may include only the audit and compliance engine 250, while in another implementation the system 140 may only include the deduction calculation engine 220.

The vendor identification engine 210 may identify one or more vendors 130 that are subject to the jurisdiction of a tax authority 110. In some implementations, the vendor identification engine 210 may identify the vendors 130 based on electronic transaction data 125 received from the electronic payment processors 120. The electronic transactions may include records of electronic transactions processed for a variety of vendors over a period of time. The vendor identification engine 210 may then process the electronic transaction data 125 to identify the vendors 130 that are likely to be subject to the jurisdiction of the tax authority 110. For example, the vendor identification engine 210 may process the electronic transaction data 125 to extract geographical information such as zip codes or cities associated with the vendors 130, or the customers of the vendors 130. The vendor identification engine 210 may then identify vendors 130 that are likely to be in the jurisdiction of the tax authority based on the geographic information.

The vendor information engine 210 may further identify the one or more vendors 130 based on information provided by the tax authorities 110. This information may include information about the vendors 130 that are currently registered in the jurisdiction (i.e., the registered vendor data 215), and information regarding changes to vendor 130 status such as openings, closings, changes of addresses, etc.

The vendor identification engine 210 may further identify vendors 130 using outside information from third-party sources or databases (i.e., the third-party information 270). The third-party sources may include sources such as Dun and Bradstreet or other sources which may help identify the geographical location of vendors 130.

In some implementations, the vendor identification engine 210 may query the electronic payment processors 120 to assist in identifying all vendors 130 that are subject to the jurisdiction of the tax authority 110. For example, the electronic payment processors 120 may identify all vendors 130 that are associated with a particular zip code or geographic area.

The deduction calculation engine 220 may calculate a deduction for the electronic payment processors 120 to apply to the electronic transactions of each vendor 130. The applied deduction may be based on one or more taxes or other fees applied by the tax authority 110. The deduction may be one of an applied percentage or a specified amount. The applied percentage may be a percentage that is deducted from each electronic transaction or that is deducted from batches of transactions. The specified amount may be a dollar amount that is deducted from the electronic transactions. The specified amount may be deducted periodically or every time that a total amount of electronic transactions processed by the electronic payment processors 120 reaches a threshold.

In some implementations, a deduction may be calculated for single taxes and/or fees assessed by the tax authority 110. For example, there may be a deduction based on the sales tax and a deduction based on business taxes. The particular rate used for the deduction may be provided by the tax authority 110, for example. Alternatively, the deduction may be calculated based on a combination of taxes and/or fees.

The deduction may be calculated only based on the tax, or may be calculated using other information such as the tax return data 117 associated with the vendors 130 or third-party information such as information about an industry associated with the vendor 130. For example, a state tax authority 110 may impose a 6% sales tax on purchases. Accordingly, when only considering the tax, the deduction calculation engine 220 may determine that the deduction is a 6% applied percentage. However, based on the tax filing of a previous year when compared with the electronic payments processed for the vendor 130 in that same year, the deduction calculation engine 220 may determine that the vendor 130 has a significant amount of cash transactions. To attempt to capture the sales tax associated with these cash transactions, the deduction calculation engine 220 may increase the applied percentage to 8%. The amount of the increase may be determined by the deduction calculation engine 220 based on an estimated ratio of electronic to cash sales for the vendor 130 as well as information about the industry associated with the vendor 130. For example, industries known to receive a large amount of cash transactions such as restaurants may receive a larger applied percentage than industries known to have a low amount of cash transactions.

The deduction calculation engine 220 may further periodically revise or adjust the calculated deduction for a vendor 130. For example, the deduction calculation engine 220 may use vendor tax registration or tax return information from the tax return data 117 to identify trends in the tax obligations of a vendor 130. For example, the deduction calculation engine 220 may determine that a vendor 130 is likely to owe less business tax this year, and may lower the deduction associated with the vendor 130 to reflect the determination.

The deduction and calculation engine 220 may further generate and provide instructions to the electronic payment processors 120 to apply a determined deduction to the electronic transactions for each vendor 130. The instructions may specify that any funds that result from the deductions may be provided to an account associated with the collection and analysis system 140, or an account associated with the applicable tax authorities 110.

The deduction and calculation engine 220 may receive an accounting of the electronic payments processed by the electronic payments processors 120. The accounting may include indicators of any funds collected from each vendor 130 as a result of applying the deductions. The accounting may be stored by the deduction and calculation engine 220 in the deduction storage 270. The accounting may be provided to the deduction calculation engine 220 periodically (e.g., daily, weekly, monthly, etc.), or when requested by the deduction calculation engine 220.

The audit and compliance engine 250 may process the received stored accounting to verify that the deductions associated with each vendor 130 were properly applied by the electronic payment processors 120. In addition, the deduction and calculation engine 220 may further verify that any funds purported to have been provided and/or deposited were in fact provided and/or deposited. The audit and compliance engine 250 may process the received stored accounting periodically or when requested by a user or administrator, for example.

The audit and compliance engine 250 may further audit past tax returns from one or more vendors 130 to identify evidence of past under reporting or non-reporting of taxes. The audit and compliance engine 250 may receive the past tax returns as part of the tax return data 117. Any evidence of past under reporting or non-reporting of taxes may then be provided to the tax authorities 110.

In some implementations, the audit and compliance engine 250 may identify under reporting or non-reporting by a vendor 130 by comparing the current revenue or sales of the vendor 130, based on current tax return or filing information and/or electronic transactions, with the reported revenue or sales of the vendor 130 from past tax returns or filings. If the reported revenue or sales on past tax returns differs more than an expected amount from the current predicted revenue or sales, then the vendor 130 may be identified as a possible under reporting or non-reporting vendor 130.

In some implementations, the audit and compliance engine 250 may identify an under reporting or non-reporting vendor 130 by building a model that predicts the sales or revenue for a vendor 130 at various times based on the current sales and revenue of the vendor 130 as determined from the electronic transaction data 125 associated with the vendor 130. The model may be built using the electronic transaction data 125 as well as historical information about an industry associated with the vendor 130 such as average growth rate, and other more general information about the economy such as inflation. The model may be generated using a variety of methods including, but not limited to machine learning, artificial intelligence, business analytics, or other statistical methods.

The audit and compliance engine 250 may then use the model to predict the revenue or sales of the vendor 130 for a previous year or period. The predicted revenue or sales may then be compared against reported revenue or sales from the tax return data 117. If the reported revenue or sales is different than the predicted revenue or sales by more than a threshold amount, then the vendor 130 may be identified as a possibly under reporting or non-reporting vendor 130. The audit and compliance engine 250 may also use the model to predict the revenue or sales of a vendor for future or current years. The predicted revenue or sales may then be compared against currently filed tax returns or tax filings and may be used to identify current evidence of under reporting or non-reporting by vendors 130.

The audit and compliance engine 250 may further identify under reporting or non-reporting vendors 130 using third-party information 270. The third party information 270 may include publically available information from sources such as Dun and Bradstreet, or one or more government related filings associated with the vendors 130 such as SEC filings, for example.

The interface and reporting engine 260 may provide an interface, such as a web page, through which one or more of the vendors 130 and/or tax authorities 110 may interact with the collection and analysis system 140. The vendors 130 and/or tax authorities 110 may use the interface to view or request one or more reports 145. In some implementations, the reports 145 may include information about the funds collected from the vendors 130 and provided to the tax authorities 110. For example, a user associated with a vendor 130 may use a web page to view the amount of funds that have been collected from the vendor 130 and provided to the tax authority 110. Similarly, a user associated with a tax authority 130 may use a web page to view the amount of funds that have been collected from the vendors 130 so far for a current tax period.

With respect to the vendors 130, a vendor 130 may use the interface provided by the interface and reporting engine 260 to request and view a variety of reports 145. The information in the reports 145 may be customized based on parameters provided by the vendor 130. For example, the vendor 130 may request reports 145 of funds withheld from the vendor 130 for particular date ranges, for particular taxes, for particular tax authorities 110, or for particular types of electronic transactions. Other parameters may be supported.

With respect to the tax authorities 110, a tax authority 110 may also use the interface provided by the interface and reporting engine 260 to request and view a variety of reports 145. The information in the reports 145 may be customized based on parameters provided by the tax authority 110. For example, the tax authority 110 may request reports with revenues collected for particular date ranges, from particular vendors 130, or for particular taxes. Other parameters may be supported. In some implementations, the parameters may include a request for projected revenue from one or more vendors 130, or for particular taxes.

In some implementations, the vendors 130 may further use the interface provided by the interface and reporting engine 260 to file and or prepare tax returns or tax filings with the tax authorities 110. The tax returns or tax filings may be prepared for a vendor 130 based on the electronic transaction data 125 associated with the vendor 130 (i.e., electronic transactions), along with supplemental data provided by the vendor 130 through the interface. The supplemental data may include expenses, cash revenue, and any other information that may be relevant and/or required for the preparation of a tax return or tax filing. The interface and reporting engine 260 may further electronically file the tax return or filing with the tax authority 110, as well as assist the vendor 130 in paying any additional tax or taxes owed to the tax authority 110.

Figure 3:
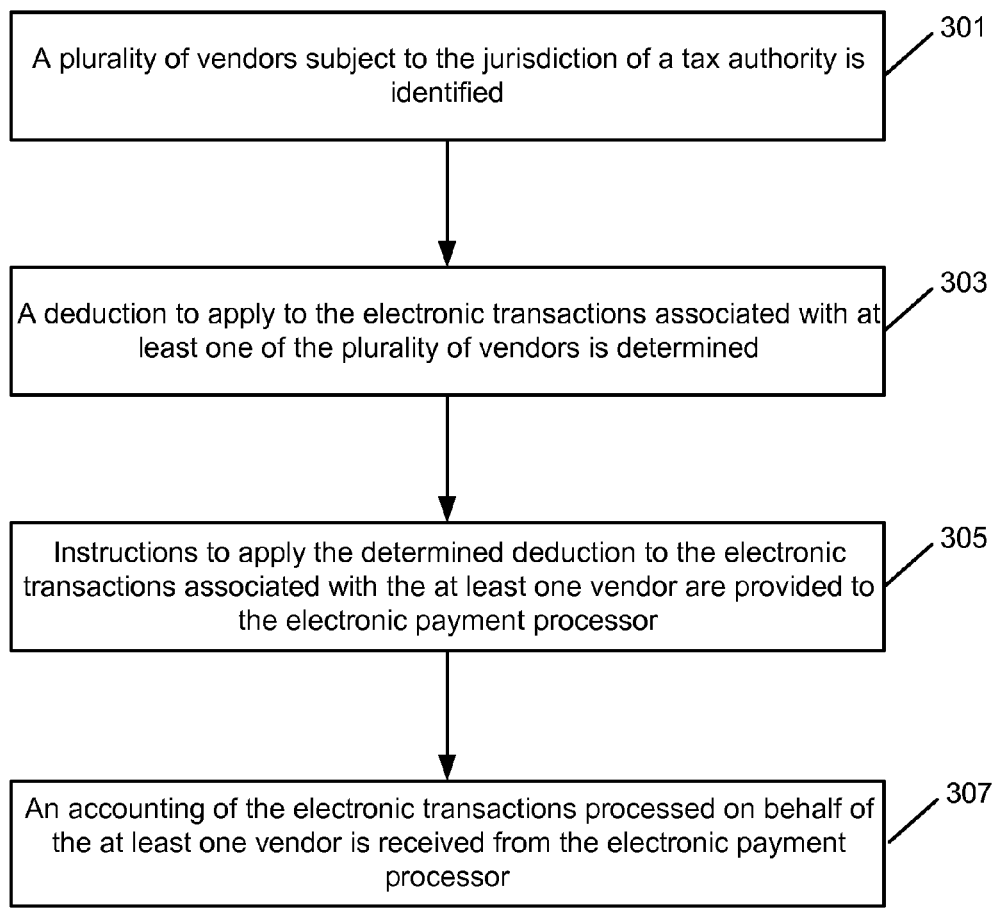
FIG. 3 is an operational flow of an implementation of a method for determining a deduction to apply to electronic transactions associated with one or more vendors.

FIG. 3 is an operational flow of an implementation of a method 300 for determining a deduction to apply to electronic transactions associated with one or more vendors 130. The method 300 may be implemented by the collection and analysis system 140.

A plurality of vendors subject to the jurisdiction of a tax authority is identified at 301. The plurality of vendors 130 may be identified by the vendor identification engine 210 of the collection and analysis system 140. In some implementations, the vendors 130 may be identified by processing electronic transaction data received from one or more electronic payment processors 120 to determine geographic information associated with one or more vendors 130. The vendors 130 with associated geographic information, such as zip codes, that are within the jurisdiction of the tax authority 110 may be identified. In other implementations, the identification may be based on registered vendor data 215 provided by the tax authority 110, or third-party information 270 such as databases or other public and private sources.

A deduction to apply to the electronic transactions associated with at least one of the plurality of vendors is determined at 303. The deduction may be determined by the deduction calculation engine 220 of the collection and analysis system 140. The deduction may be determined in accordance with one or more taxes imposed by the tax authority 110. The deduction may be one of an applied percentage or a specified amount. In some implementations, the deduction may be determined based on the tax and other information related to the amount of revenue or sales associated with the vendor 130. For example, tax returns or tax filings from the tax return data 117 associated with the vendor 130 may be consulted by the deduction calculation engine 220.

The determined deduction may be greater than the tax associated with the deduction to account for non-electronic transactions made by the vendor 130. For example, if the tax is a sales tax of 6%, then the deduction may be 8% to account for cash sales of the vendor 130 that would not be subject to the deduction because they are not electronic transactions.

Instructions to apply the determined deduction to electronic transactions associated with the at least one vendor are provided at 305. The instructions may be provided by the deduction calculation engine 220 of the collection and analysis system 140 to one or more of the electronic payment processors 120. The instructions are executory in nature and may direct that the relevant electronic payment processors 120 deduct the specified amounts or percentages from the transactions prior to settlement with the vendors. The instructions may further direct the electronic payment processors 120 to send the monies to accounts controlled by the tax authority 110 and/or its agents.

An accounting of the electronic transactions processed on behalf of the at least one vendor is received at 307. The accounting may be received by the collection and analysis system 140 from the one or more electronic payment processors 120. The accounting may include the identifiers of the transactions processed by the electronic payment processors 120 on behalf of the one or more vendors 130 and the amount that was deducted from each transaction. The accounting may further indicate whether or not the resulting funds were provided to the tax authorities 110 and/or the collection and analysis system 140. The collection and analysis system 140 may store the accounting at the deduction storage 270.

A report of the applied deductions is provided at 309. The report 145 may be provided by the interface and reporting engine 260 of the collection and analysis system 140 to one or more of the at least one vendor 130 and/or the tax authority 110. The report 145 may be generated and provided at the request of the at least one vendor 130 and/or tax authority 110, or automatically. With respect to the at least one vendor 130, the report 145 may include the amount of funds that have been collected and provided to the tax authority 110 on behalf of the at least one vendor 130. With respect to the tax authority 110, the report 145 may include an amount of funds that have been collected and provided to the tax authority 110 from each vendor 130, and may further include an estimate of the taxes that the collection and analysis system 140 believes will be collected at the end of the current year or tax period.

Figure 4:
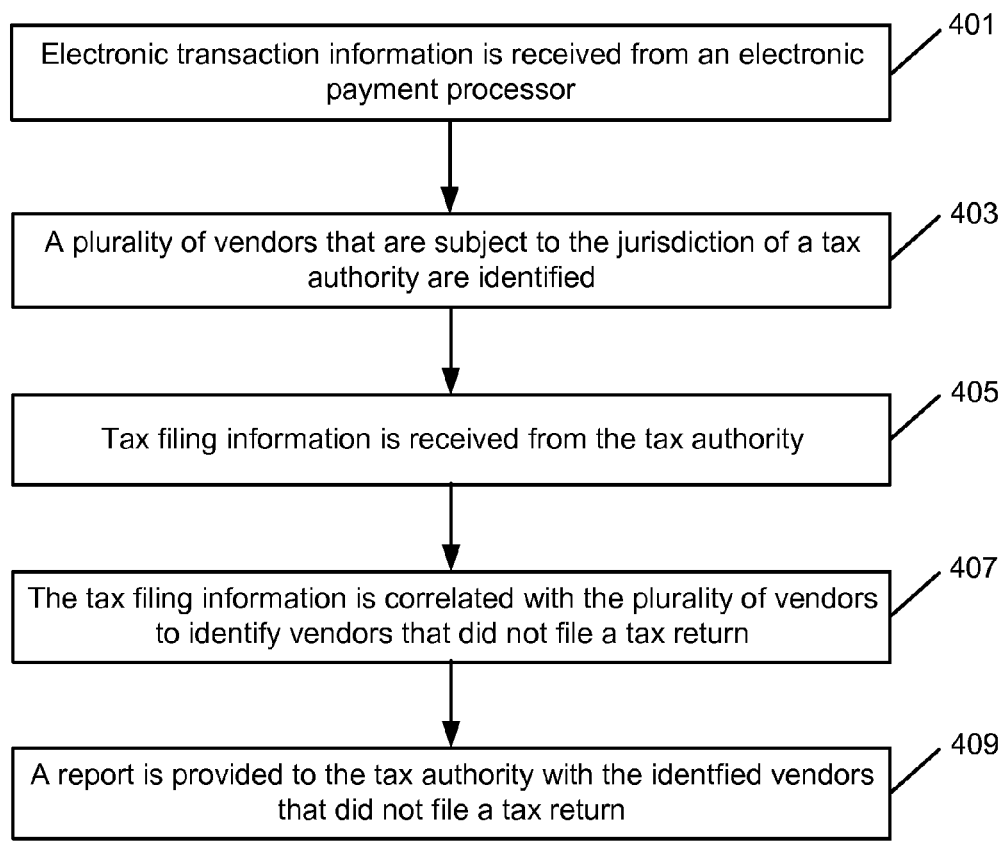
FIG. 4 is an operational flow of an implementation of a method for identifying vendors that did not file a tax return.

FIG. 4 is an operational flow of an implementation of a method 400 for identifying vendors that did not file a tax return. The method 400 may be implemented by the collection and analysis system 140.

Electronic transaction information is received from an electronic payment processor at 401. This information may be received in response to queries submitted by the collections and analysis system 110. The electronic transaction information may be received by the vendor identification engine 210 of the collection and analysis system 140. The electronic transaction information may be received from one or more electronic payment processors 120. The electronic transaction information may be a plurality of electronic transactions that were processed on behalf of one or more vendors 130.

A plurality of vendors that are subject to the jurisdiction of the tax authority is identified at 403. The plurality of vendors 130 may be identified by the vendor identification engine 210 of the collection and analysis system 140 based on the electronic transaction information. For example, the vendor identification engine 210 may extract geographic information from the electronic transaction information such as zip codes, and may determine the plurality of vendors 130 based on vendors 130 whose transactions are associated with geographic information that falls within the jurisdiction of the tax authority 110.

Tax filing information is received from the tax authority at 405. The tax filing information may be received by the audit and compliance engine 250 of the collection and analysis system 140. The tax filing information may be part of the tax return data 117 provided by one or more tax authorities 110, and may indicate one or more taxes paid by one or more of the vendors 130 for one or more years or tax periods.

The tax filing information is correlated with the plurality of vendors to identify vendors that did not file a tax return at 407. The tax filing information may be correlated by the audit and compliance engine 250 of the collection and analysis system 130. The correlation may identify vendors 130 that were subject to the jurisdiction of a tax authority 110 during a particular year or tax period, but that did not file or provide a tax return. In some implementations, the correlation may further estimate the taxes that each vendor 130 may have owed for a particular year or period, and may identify vendors 130 that may have underpaid one or more taxes during the particular year or period.

A report is provided to the tax authority with the identified vendors that did not file a tax return at 409. The report may be the report 145 and may be provided by the interface and reporting engine 260 to one or more tax authorities 110. The report 145 may identify vendors 130 that may not have paid one or more taxes to the tax authority 110, or that may have underpaid one or more taxes.

Figure 5:
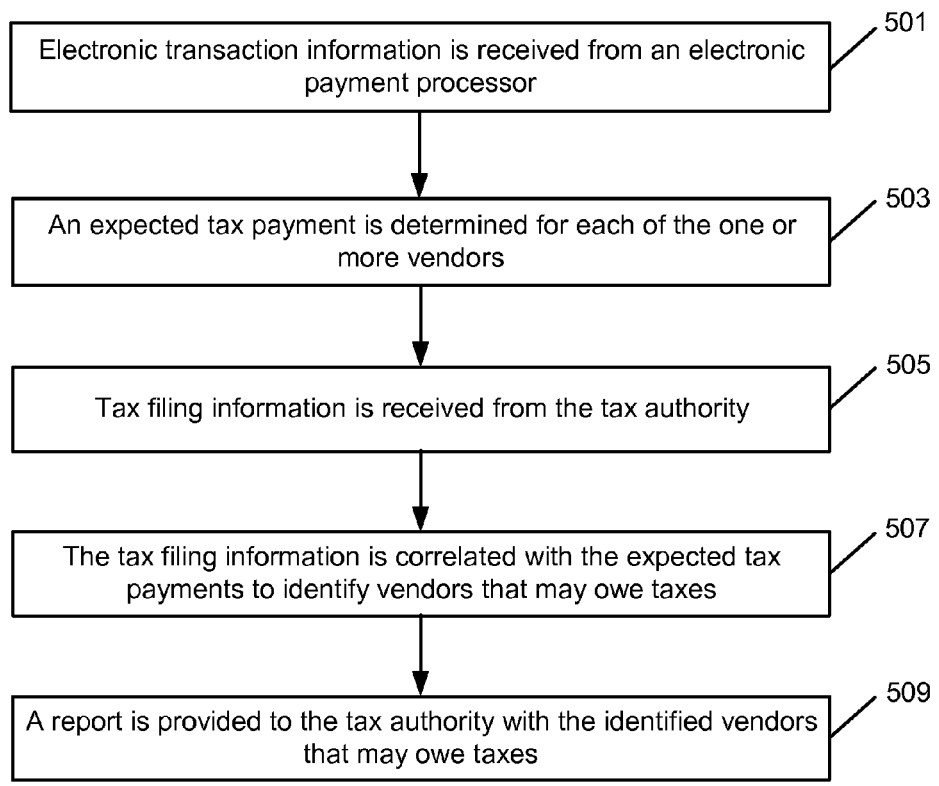
FIG. 5 is an operational flow of an implementation of a method for identifying vendors that may have underpaid a tax.

FIG. 5 is an operational flow of an implementation of a method 500 for identifying vendors that may have underpaid a tax. The method 500 may be implemented by the collection and analysis system 140.

Electronic transaction information is received from an electronic payment processor at 501. This information may be received in response to queries submitted by the collections and analysis system 140. The electronic transaction information may be received by the vendor identification engine 210 of the collection and analysis system 140. The electronic transaction information may be received from one or more electronic payment processors 120. The electronic transaction information may be a plurality of electronic transactions that were processed on behalf of one or more vendors 130.

An expected tax payment is determined for each of the one or more vendors at 503. The expected tax payment may be determined by the audit and compliance engine 250 of the collection and analysis system 140. In some implementations, the estimated tax payment for a vendor may be determined by analyzing the electronic transaction information associated with the vendor over a particular period, and generating the expected payment based on the analysis.

Tax filing information is received from the tax authority at 505. The tax filing information may be received by the audit and compliance engine 250 of the collection and analysis system 140. The tax filing information may be part of the tax return data 117 provided by one or more tax authorities 110, and may indicate one or more taxes paid by one or more of the vendors 130 for one or more years or tax periods.

The tax filing information is correlated with the expected tax payments to identify vendors that may owe taxes at 507. The tax filing information may be correlated with the expected tax payments by the audit and compliance engine 250 of the collection and analysis system 140.

A report is provided to the tax authority with the identified vendors that may owe taxes at 509. The report 145 may be provided by the interface and reporting engine 260 to one or more tax authorities 110.

Figure 6:
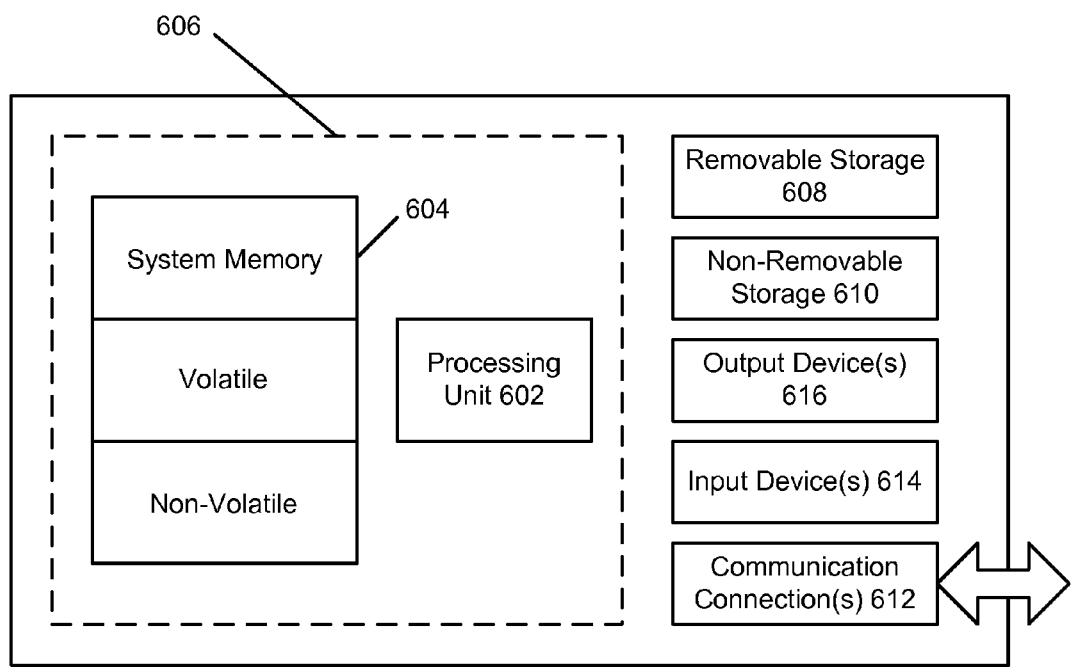
FIG. 6 shows an exemplary computing environment in which example embodiments and aspects may be implemented.

FIG. 6 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well-known computing systems, environments, and/or configurations that may be suitable for use include, but are not limited to, personal computers, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing system 600. In its most basic configuration, computing system 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing system 600 may have additional features/functionality. For example, computing system 600 may include additional storage (removable and/or non-removable) including, but not limited to, magnetic or optical disks or tape. Such additional storage is illustrated in FIG. 6 by removable storage 608 and non-removable storage 610.

Computing system 600 typically includes a variety of computer readable media. Computer readable media can be any available media that can be accessed by computing system 600 and includes both volatile and non-volatile media, removable and non-removable media.

Figure 7:
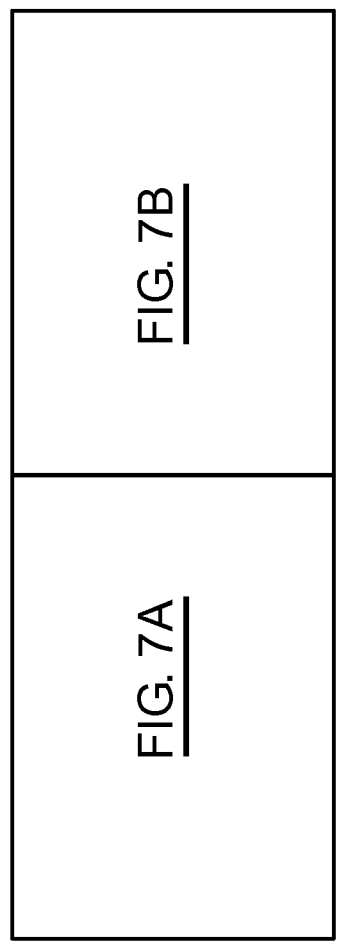
FIGS. 7, 7(a) and 7(b) illustrates an example of a system for tax matching and/or identification in an embodiment.
Figure 7A:
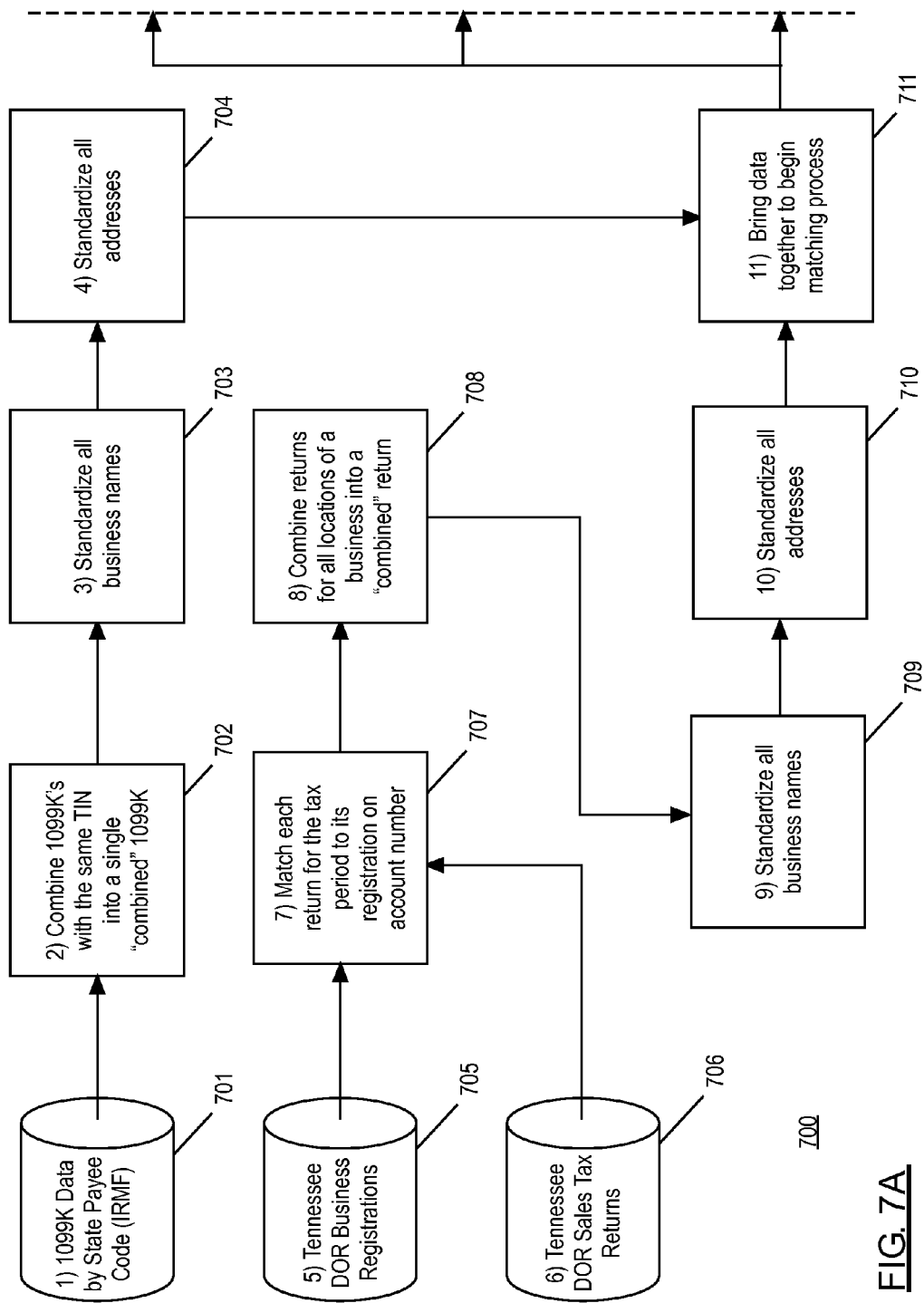
Figure 7B:
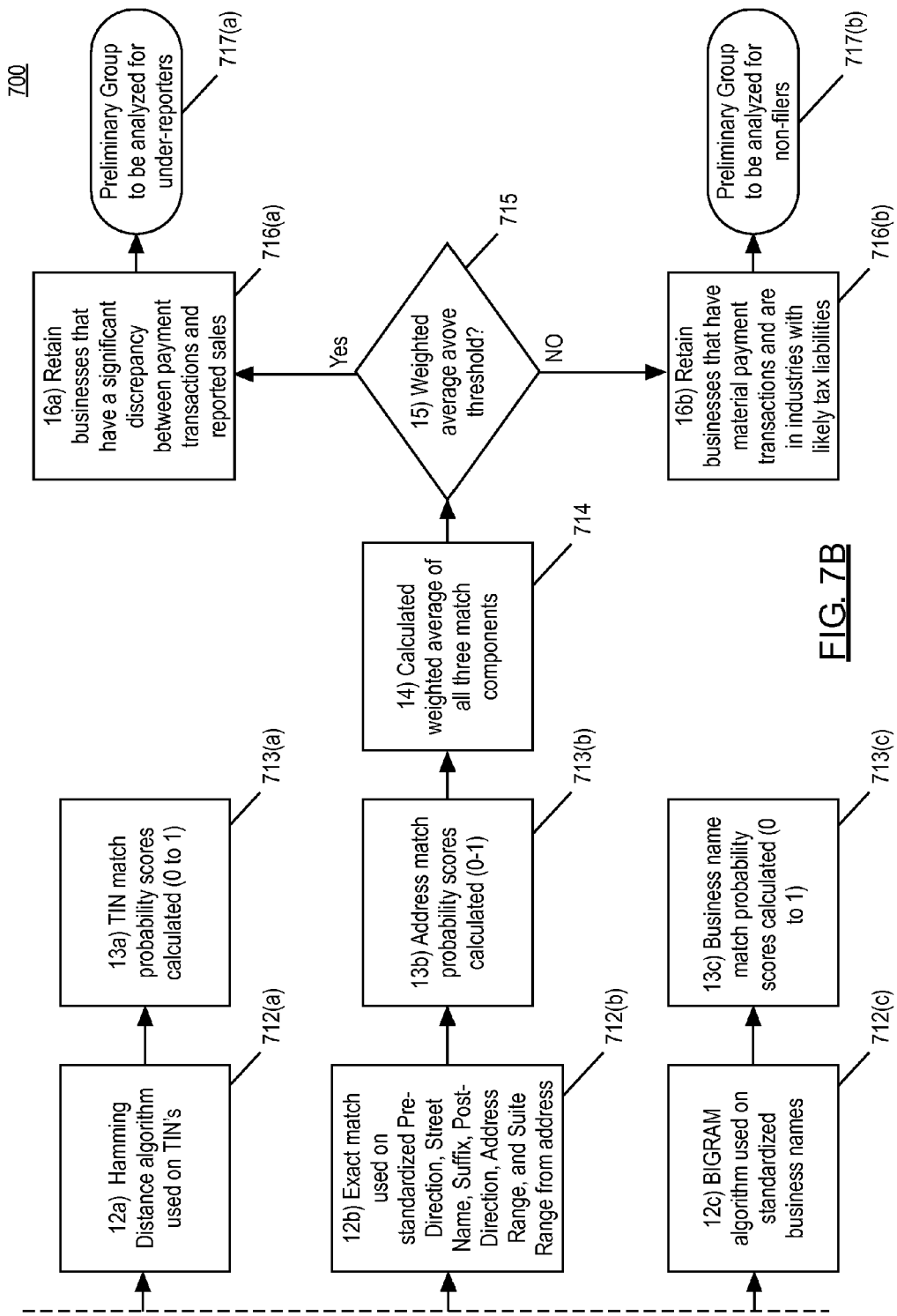

FIGS. 7, 7(*a*) and 7(*b*) includes a system and method for tax matching and/or identification 700. The system of FIGS. 7, 7(*a*) and 7(*b*) may be operated on or in conjunction with system 600 in an embodiment. The system of FIGS. 7, 7(*a*) and 7(*b* may be performed all or in part electronically or automatically. The system 700 may receive electronically or automatically tax information including payee tax identification number (TIN), payee names, payee addresses, and the amount owed in 701. In 702, the system 700 may then apply one or more set based algorithms to the information in 701. An example algorithm is as follows:

select "Payee TIN", "Payee Name", "Payee Address", SUM(1099K Amount 1), Count(1099K Amount 1) from "2014 IRS IRMF Data"
  where "Document Code"=99/*1099 K*/ group by "Payee TIN", "Payee Name", "Payee Address"

In 703 and 704, the system 700 may apply name and address standardization software/algorithms on the result set from "IRS 1099K Data." The name standardization process may use a dictionary of business terminology and a standard set of values to use when any term is matched in an embodiment. The address standardization process may be applied and may apply one or more parsing algorithms along with a USPS certified database of valid US (and/or comparable foreign) addresses to ensure that each and every address is valid and in the preferred postal delivery format. Other standardized forms of representing addresses may be used. The address standardization process may decompose the address down into one or more of its component parts, including, but not limited to the following: Pre Direction, Street Name, Street Suffix, Post Direction, Address Range, Suite Range, Zip 5, and Zip 4.

In 705, state identification information including federal employer identification numbers (FEIN), state identification numbers, business names, addresses, and locations may be electronically and/or automatically received by system 700. In 706, the system may receive raw tax data including state ID, tax period, tax year, and sales. In 707 and 708, a set-based algorithm may be applied to form a single combined record for all businesses for a tax year, merging multiple tax filings together for the same business. An example algorithm is as follows. select "FEIN", "Business Name", "Main Address", "Tax Year", SUM("Sales"), Count (Distinct "State ID") from "State Registration Data", "State Tax Return Data" where "State Registration Data"."State ID"="State Tax Return Data"."State ID" and Tax Year=2014 group by "FEIN", "Business Name", "Main Address", "Tax Year"

In 709 and 710, name and address standardization software/algorithms on the result set from "State Tax Data" may be applied. The name standardization process may use a dictionary of business terminology and a standard set of values to use when any term is matched in an embodiment. The address standardization process may be applied and may apply one or more parsing algorithms along with a USPS certified database of valid US (and/or comparable foreign) addresses to ensure that each and every address is valid and in the preferred postal delivery format. The address standardization process may decompose the address down into one or more of its component parts, including, but not limited to the following: Pre Direction, Street Name, Street Suffix, Post Direction, Address Range, Suite Range, Zip 5, and Zip 4.

As shown in FIG. 7(*a*), in 711, the matching process begins. As shown in FIG. 7(*b*), in 712(*a*) and 713(*a*), a hamming algorithm or similar fixed length matching algorithm may be applied to every possible combination of Payee TIN in the standardized IRS 1099 K Data and FEIN in the standardized tax data. The hamming algorithm may compare two equal-length strings or numbers. In one embodiment, the hamming algorithm may compare the Payee TIN from the IRS 1099 K Data to the FEIN in the state data, both of which may have the same length. The output of the hamming algorithm, which may be a real number between 0 and 1, may represent the number of changes that would need to be made to the first string/number to make it equivalent to the second string/number. A result of 1 indicates that no changes need to be made, i.e. every character in the two strings matches. A result of 0 indicates that every character in the first string would need to be changed before the two strings would be identical. A number between 0 and 1 indicates that some characters are the same, but others are not, with higher numbers indicating more similarity. Other methods may be used to achieve the general matching and scoring results.

In 712(*b*) and 713(*b*), an exact match of addresses may be performed. This matching process may compare each address and individual component of each address produced from 704 of "IRS 1099K Data" to each address and individual component of each address produced from 710 of "State Tax Data". A number of 1 may be produced from an individual comparison if a given address in "IRS 1099K Data" matched exactly on every individual component (Pre Direction, Street Name, Zip 5, etc.) to each and every individual component in a given address in "State Tax Data". When one or more of the individual components does not match, a score of 0 will be assigned indicating the addresses are not a match. The matching algorithm may allow for some address components to be blank or missing without penalizing the match (e.g. the "State Tax Data" indicates the exact same address as an address the "IRS 1099K Data", but a Suite number is present in one address, but not present in the other) in some embodiments.

In 712(*c*) and 713(*c*), a BIGRAM algorithm comparing every business name in the standardized IRS 1099 K data to every business name in the standardized tax data. In one embodiment, BIGRAM algorithm may be applied where two longer strings are being compared that will not always be of equal length. Other variable string matching algorithms may be also be used. In one case, the Payee Name from the IRS 1099 K Data and the business name from the state data. The BIGRAM algorithm may match data based on the occurrence of pairs of characters in both strings. The greater the number of common pairs of characters between two strings, the higher the match score. The output may be expressed as a number between 0 and 1, where 0 indicates there are no matching pairs of characters between the string and 1 indicates all pairs are matching. In one example, "Acme Corp, Amarillo, Tex. 55402-1930" and "Acme Corp, 55402-1930" would score well below 0.5 on a Hamming algorithm. Other similar fixed-length string matching algorithms may be used but would score significantly higher with a BIGRAM or similar variable length string matching algorithm. Other algorithms may be used to achieve the general matching and scoring principals.

In 714, system 700 may calculate average/weighted average and the number of matches that exceed a threshold from steps 712 (*a*)-(*c*) and 713 (*a*)-(*c*). In one example, every record in the "State Tax Data" set may be compared to every record in the "IRS 1099K Data" set three times, one time each for FEIN/TIN, Name, and Address. If for example, there are 1,000 "IRS 1099K Data" records and 2,000 "State Tax Data" records, there would be 2,000,000 total matches (1,000.times.2,000) and 3 distinct scores for each match (for a total of 6,000,000 match scores). The weighted match score for each match is calculated as "(FEIN/TIN match score.times.FEIN/TIN weight)+(Name match score.times.Name weight)+(Address match score.times.Address weight). One weighting scheme used may weigh the FEIN/

TIN match score at 50%, the Name match score at 30% and the Address match score at 20%. The exact weights and thresholds may be varied.

In 715, the match results may be finalized by building one or more lists. A list may include only matches that exceeded a score (i.e. 0.7) on two different matches would be included in this list (i.e. FEIN/TIN & Name match, FEIN/TIN & Address Match, or Name & Address Match). For the matches exceed one or more the thresholds, the weighting is then used to prioritize/rank the quality of the matches from highest to lowest, with the strongest matches having the highest weights. The exact weights and thresholds vary. In situations where multiple matches occur (i.e. one "IRS 1099K Data" record matches to multiple "State Tax Data" records or one "State Tax Data" record matches to multiple "IRS 1099K Data" records) the weighted averages may be used to pick a best match in one embodiment. Another list would include "IRS 1099K Data" records that matched on only one or zero match criteria to every single "State Tax Data" record (i.e. across all matches two or all three of the match scores fall below 0.7). In an embodiment, these "IRS 1099K Data" records may have no viable matches in the "State Tax Data" set. Yet another list may include "State Tax Data" records that matched on one or zero match criteria to every single "IRS 1099K Data" record (i.e. across all matches, two or all three of the match scores fall below 0.7). In an embodiment, these "State Tax Data" records may have no viable matches in the "IRS 1099K Data" set.

In 716 (*a*), from the list of matched results, the first list produced in 715, a ranked list of all businesses may be generated. In one embodiment matches with a higher discrepancy between revenue reported on the IRS 1099 K may be sorted higher than those with a lower (or even possibly negative) discrepancy to that reported in the "State Tax Data". In an embodiment, these are businesses that are candidates for under filing in 717(*a*). That is, the IRS 1099K revenue numbers suggest that the business may be collecting more revenue from their clients/customers than they are reporting to the State Taxing Authority.

A list of non-filer candidates may then be generated from the second list produced in 715, as shown in 717(*b*). This list included all IRS 1099K Data records for which no suitable match was found in the State Tax Data or the weighted average was below a threshold. This may suggest a business that may not have registered with the state and is thus reporting no revenue to the state. The ranking algorithm for this list may vary. In one embodiment, this list may be ranked by the amount reported in revenue on the 1099K in 716(*b*), thus producing a list of taxpayers with higher revenues as primary candidates for further investigation in industries with likely tax liabilities. Other filtering criteria may also be applied to one or more of these lists in one embodiment. The additional filtering criteria may vary from in an embodiment. In one embodiment, tax liability statues may be implemented. For example, many states do not require sales tax liabilities for businesses services rendered (only for goods sold), thus requiring a filtering algorithm to remove service businesses from the result sets.

Figure 8:
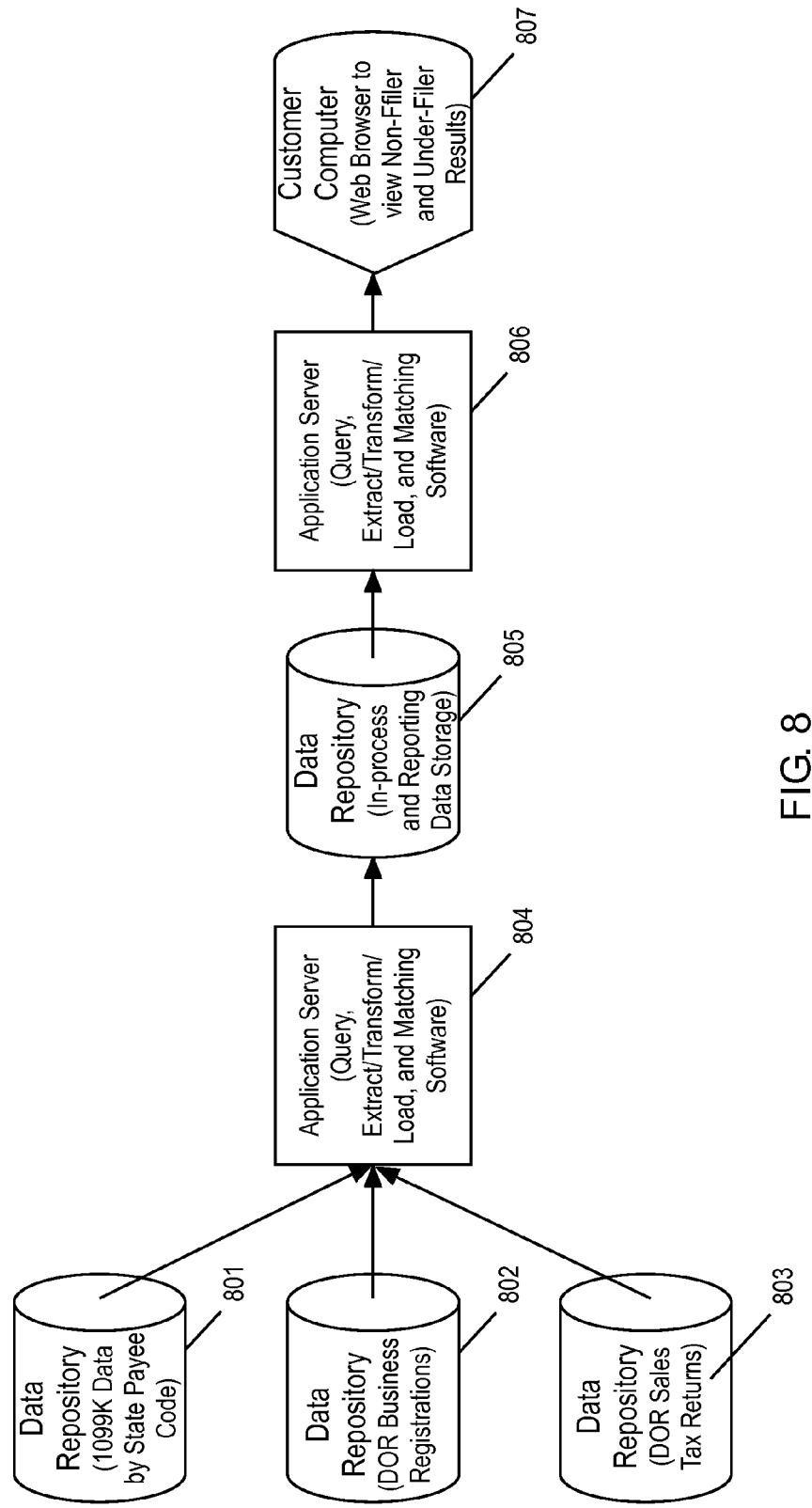
FIG. 8 shows an exemplary computing environment in which example embodiments and aspects may be implemented.

In another embodiment, the system and method of FIGS. 7, 7(*a*), and 7(*b*) may be performed all or in part using the computer system 800 of FIG. 8. As shown, system 800 may include hardware, such as servers and databases, running one or more executable software applications located off site or on-site. In another embodiment, the system 800 may be executed in part or wholly in a cloud computing environment. In a cloud environment, the system 800 may be accessible through a virtual private network. The data may be protected using various levels of encryption and encoding. The system 801 may include data repositories 801-803. The repositories may include any hardware suitable for storing tax-related data. The application server 804 may include executable code and software modules for performing on or more steps 702-716 (*a*)-(*b*) of FIG. 7. The system 800 may also include a data repository 805 for in process and data storage similar to data repository 801-803. In one embodiment, the system may also include an application server 806 including reporting software and execute steps 717(*a*)-(*b*).

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system 600. Any such computer storage media may be part of computing system 600.

Computing system 600 may contain communications connection(s) 612 that allow the device to communicate with other devices and/or interfaces. Computing system 600 may also have input device(s) 614 such as a keyboard (software or hardware), mouse, pen, voice input interface, touch interface, etc. Output device(s) 616 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A robotic detection apparatus with artificial intelligence and machine learning, comprising:
   a processor,
   a memory in communication with the processor, and
   the memory being encoded with programming instructions executable by the processor to:
      receive electronic transaction information from an electronic payment processor of an electronic payment provider;
      apply one or more algorithms to the received electronic transaction information to generate a set of electronic transaction information, wherein applying the one or more algorithms comprises:
         applying a name standardizing process to the received electronic transaction information using a dictionary of business terminology and a standard set of values to use when any term is matched,
         applying an address standardizing process to the received electronic transaction information using a certified database of valid addresses to ensure each and every address is valid and in the preferred postal delivery format thereby decomposing the address down into one or more component parts,
         applying a fixed length matching process to the received electronic transaction information to determine a tax identification number (TIN) match,
         determining a name match from the name standardized electronic transaction information and an address match from the address standardized electronic transaction information, and
         calculating a weighted average above a predetermined threshold of the TIN match, the name match and the address match to generate the set of electronic transaction information:
      identify, using the set of electronic transaction information, a set of vendors that are subject to the jurisdiction of a tax authority, wherein the set of electronic transaction information describes a plurality of consumer purchases from vendors that are taxable by the tax authority, and wherein the set of electronic transaction information is received without communication with point-of-sale systems of the vendors;
      determine that the tax authority does not tax a first category of transaction but does tax a second category of transaction;
      disregard at least one electronic transaction in the set of electronic transaction information, wherein the at least one transaction is associated with the first category of transaction;
      correlate tax payment information from the tax authority with the set of vendors to produce a correlated data set;
      identify a first vendor from the set of vendors as a function of the correlated data set, where the first vendor had tax liability but did not file a return;
      report the first vendor to the tax authority using a reporting engine;
      determine a set of one or more expected tax payments for a second vendor from the set of vendors as a function of the set of electronic transaction information, wherein the set of one or more expected tax payments are determined based upon one or more of the plurality of consumer purchases that involved the second vendor, and wherein the determination of the set of one or more expected tax payments does not require any information from a point-of-sale system of any vendor in the identified set of vendors;
      as a function of the tax payment information, determine a set of one or more actual tax payments credited to the second vendor;
      calculate an underpaid amount as a function of the set of one or more expected tax payments and the set of one or more actual tax payments;
      report the underpaid amount and identifying information for the second vendor to the tax authority using the reporting engine; and
      cause the underpaid amount to be automatically collected from an account associated with the second vendor.

2. The robotic detection apparatus of claim 1, wherein the correlation operation is performed as a function of a first tax identification number from the electronic transaction information and a second tax identification number from the tax payment information.

3. The robotic detection apparatus of claim 2, wherein the tax payment information comprises at least one thousand tax identification numbers, the identified set of vendors comprises at least one thousand vendors, and wherein the processor is configured to correlate the tax payment information and the identified set of vendors in less than one minute.

4. The robotic detection apparatus of claim 1, wherein the set of electronic transaction information comprises a first set of information indicating a geographic presence in the jurisdiction of the tax authority and a second set of information indicating a business presence in the jurisdiction of the tax authority, and
   the identification of a set of vendors that are subject to the jurisdiction of the tax authority occurs as a function of the first set of information and the second set of information.

5. The robotic detection apparatus of claim 1, wherein the programming instructions are further executable by the processor to:
   determine an estimated tax payment for a third vendor in the set of identified vendors as a function of the set of electronic transaction information, wherein the estimated tax payment is due at a time subsequent to this determination; and
   automatically make the estimated tax payment to the tax authority before the reporting operation.

6. The robotic detection apparatus of claim 1, wherein the processor is further configured to:
   after the time at which the estimated tax payment is due, determine an actual tax payment amount for the third vendor as a function of the tax payment information; and
   where the actual tax payment amount does not fall within a predetermined margin around the estimated tax payment, provide an estimated tax underpayment notice to the tax authority using the reporting engine.

7. A method executed by a robotic detection apparatus with artificial intelligence, machine learning, a vendor identification engine, and a compliance engine, comprising the steps of:
   (i) receiving electronic transaction information from an electronic payment processor of an electronic payment provider;

(ii) applying one or more algorithms to the received electronic transaction information to generate a set of electronic transaction information, wherein applying the one or more algorithms comprises:
  applying a name standardizing process to the received electronic transaction information using a dictionary of business terminology and a standard set of values to use when any term is matched,
  applying an address standardizing process to the received electronic transaction information using a certified database of valid addresses to ensure each and every address is valid and in the preferred postal delivery format thereby decomposing the address down into one or more component parts,
  applying a fixed length matching process to the received electronic transaction information to determine a tax identification number (TIN) match,
  determining a name match from the name standardized electronic transaction information and an address match from the address standardized electronic transaction information, and
  calculating a weighted average above a predetermined threshold of the TIN match, the name match and the address match to generate the set of electronic transaction information:
(iii) using a vendor identification engine, identifying a set of vendors that are subject to the jurisdiction of a tax authority as a function of the set of electronic transaction information, wherein the set of electronic transaction information describes a plurality of consumer purchases from the set of vendors that are taxable by the tax authority;
(iv) determining that the tax authority does not tax a first category of transaction but does tax a second category of transaction;
(v) disregarding at least one electronic transaction in the set of electronic transaction information, wherein the at least one transaction is associated with the first category of transaction;
(vi) using a compliance engine, identifying a set of paid taxes from a set of tax filings received from the tax authority;
(vii) correlating the set of paid taxes with the set of vendors to produce a correlated data set;
(viii) identifying a first vendor from the set of vendors as a function of the correlated data set, where the set of electronic transaction information includes at least one consumer purchase from the first vendor, but the set of tax filings does not include a filing from the first vendor;
(ix) reporting information to the tax authority about the first vendor using a reporting engine;
(x) determining a set of expected tax payments for a second vendor from the set of vendors as a function of the set of electronic transaction information, wherein the set of expected tax payments is determined based on one or more consumer purchases from the second vendor in the plurality of consumer purchases;
(xi) determining a set of actual tax payments from the second vendor as a function of the set of paid taxes;
(xii) determining an amount underpaid by the second vendor as a function of the set of expected tax payments and the set of actual tax payments;
(xiii) reporting the underpaid amount by the second vendor to the tax authority using the reporting engine; and
(xiv) collecting the underpaid amount from an account associated with the second vendor as a function of the set of expected tax payments and the set of actual tax payments,
wherein the method is performed without directly communicating with a point-of-sale device of the first vendor and the second vendor.

8. The method of claim 7, further comprising the step of causing the first vendor to be contacted.

9. The method of claim 7, further comprising the steps:
printing a document showing the amount underpaid by the second vendor; and
causing the document to be delivered to the second vendor.

10. The method of claim 7, wherein
the set of paid taxes contains at least one thousand items,
the set of vendors contains at least one thousand vendors, and
the step of correlating the set of paid taxes with the set of vendors is performed within less than a minute.

11. The method of claim 7, further comprising the steps:
determining an estimated tax payment for a third vendor in the set of vendors as a function of the set of electronic transaction information, wherein the estimated tax payment is due at a time after the determining is performed; and
using the reporting engine, automatically making the estimated tax payment to the tax authority before the time at which the estimated tax payment is due.

12. The method of claim 11, further comprising the steps:
after the time at which the estimated tax payment is due, determining an actual tax payment amount for the third vendor as a function of the set of tax filings; and
where the actual tax payment amount does not fall within a predetermined margin around the estimated tax payment, providing an estimated underpayment notice to the tax authority using the reporting engine.

13. A method executed by a robotic detection apparatus with artificial intelligence, machine learning, a vendor identification engine, and a compliance engine, comprising the steps:
(i) receiving electronic transaction information from an electronic payment processor of an electronic payment provider at the robotic detection apparatus, via an electronic data network, wherein the set of electronic transaction information is encrypted when received;
(ii) decrypting the received electronic transaction information using a processor of the robotic detection apparatus;
(iii) applying one or more algorithms to the decrypted electronic transaction information to generate a set of electronic transaction information, wherein applying the one or more algorithms comprises:
  applying a name standardizing process to the received electronic transaction information using a dictionary of business terminology and a standard set of values to use when any term is matched,
  applying an address standardizing process to the received electronic transaction information using a certified database of valid addresses to ensure each and every address is valid and in the preferred postal delivery format thereby decomposing the address down into one or more component parts,
  applying a fixed length matching process to the received electronic transaction information to determine a tax identification number (TIN) match, determining a name match from the name standardized electronic transaction information and an address match from the address standardized electronic transaction information, and calculating a weighted average above a predetermined threshold of the TIN match, the name match and the address match to generate the set of electronic transaction information:

(iv) using a vendor identification engine, identifying a set of vendors that are subject to the jurisdiction of a tax authority as a function of the set of electronic transaction information, wherein the set of electronic transaction information describes a plurality of consumer purchases from the set of vendors, where the plurality of consumer purchases are taxable by the tax authority;

(v) determining that the tax authority does not tax a first category of transaction but does tax a second category of transaction;

(vi) disregarding at least one electronic transaction in the set of electronic transaction information, wherein the at least one transaction is associated with the first category of transaction;

(vii) using a compliance engine, identifying a set of paid taxes from a set of tax filing information received from the tax authority;

(viii) correlating the set of paid taxes with the set of vendors to produce a correlated data set;

(ix) determining a set of expected tax payments for a first vendor from the set of vendors, wherein this determining is performed as a function of the set of electronic transaction information and as a function of one or more purchases from the first vendor in the plurality of consumer purchases;

(x) determining a set of actual tax payments for the first vendor as a function of the set of paid taxes;

(xi) determining an underpaid amount as a function of the set of expected tax payments and the set of actual tax payments;

(xii) preparing a document showing the underpaid amount;

(xiii) causing the document to be delivered to the first vendor; and (xiv) collecting the underpaid amount from an account associated with the first vendor as a function of the set of expected tax payments and the set of actual tax payments, wherein the method is performed without directly communicating with a point-of-sale device of the first vendor.

* * * * *